(12) United States Patent
Takeuchi et al.

(10) Patent No.: US 6,272,288 B1
(45) Date of Patent: *Aug. 7, 2001

(54) VIBRATION CORRECTION SYSTEM FOR A CAMERA

(75) Inventors: Yoshihiro Takeuchi, Tokyo; Hidenori Miyamoto, Urayasu; Isao Soshi, Tokyo; Minoru Kato; Junichi Omi, both of Kawasaki, all of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,417

(22) Filed: Feb. 17, 1999

Related U.S. Application Data

(63) Continuation of application No. 08/813,120, filed on Mar. 7, 1997, now abandoned, which is a continuation of application No. 08/651,623, filed on May 22, 1996, now abandoned, which is a continuation of application No. 08/273,453, filed on Jul. 11, 1994, now abandoned.

(30) Foreign Application Priority Data

Jul. 12, 1993 (JP) .................................................. 5-171852

(51) Int. Cl.[7] .................................................. G03B 17/00
(52) U.S. Cl. .................................................. 396/55; 396/72
(58) Field of Search .................................. 396/52, 53, 54, 396/55, 72, 75, 144, 85; 348/208; 359/554, 557, 699, 700

(56) References Cited

U.S. PATENT DOCUMENTS

| | | | |
|---|---|---|---|
| 5,130,729 | * 7/1992 | Sato et al. | 354/202 |
| 5,172,276 | * 12/1992 | Ueyama et al. | 359/813 |
| 5,416,558 | * 5/1995 | Katayama et al. | 354/446 |
| 5,598,246 | * 1/1997 | Miyamoto et al. | 396/55 |
| 5,715,479 | * 2/1998 | Katayama et al. | 396/55 |
| 5,831,671 | * 11/1998 | Chigira et al. | 348/208 |
| 5,943,169 | * 8/1999 | Okada | 359/557 |

* cited by examiner

Primary Examiner—Christopher E. Mahoney

(57) ABSTRACT

A vibration correction system for a camera using a correcting lens driven by a reduction gear train attached to a motor. Image deflection, originating from vibration and the like of the camera, is prevented by shifting the correcting lens. A movement detector, to detect the amount of movement of the correcting lens, is arranged near the drive shaft of the motor or near the first couple of gears of the reduction gear train. After the correcting lens has been driven, the connecting lens is reset to a predetermined standard position, based on the output of the movement detector. By placing the movement detector on or near the drive shaft, a high resolving power is obtained. Accordingly, the correcting lens can be shifted with fine precise movements, and accurate correction of image deflection becomes possible.

8 Claims, 2 Drawing Sheets

VIBRATION CORRECTION SYSTEM FOR A CAMERA

This application is a continuation of application Ser. No. 08/813,120, filed Mar. 7, 1997, now abandoned, which is a continuation of application Ser. No. 08/651,623, filed May 22, 1996, now abandoned, which is a continuation of application Ser. No. 08/273,453, filed Jul. 11, 1994, now abandoned.

BACKGROUND OF THE INVENTION

1. Field of the Invention

The present invention relates to an improved vibration correction system for a camera, and more specifically to a vibration correction system capable of correcting the effects of extremely small vibrations and vibrations caused by hand-holding the camera.

2. Description of the Related Art

JP-A-3-110530 [Japanese Laid-Open Patent Publication 03-110530] discloses a vibration correction system for a camera. In this known system, a correcting lens, constituting a portion of the photographic lens, is driven by a drive motor. A reduction gear train is used to reduce the speed of the rotation of the motor and to convert the reduced rotation into linear motion. A shift member causes a shift of the correcting lens in a direction orthogonal to the optical axis. Image deflection, originating from vibration and the like of the camera, is prevented by judiciously shifting the correcting lens. A photointerruptor is arranged on the last gear of the reduction gear train to detect the amount of movement of the correcting lens. After the correcting lens has been driven, it is reset to a predetermined standard position based on the output of the photointerruptor. However, because the photointerruptor detects the amount of rotation of the final gear of the reduction gear train, it is in fact detecting the most reduced amount of rotation as the amount of drive of the correcting lens. Therefore, the resolving power of this known vibration correction system is too low to precisely correct for small vibrations. Further, it is difficult, if not impossible, to accurately reset the correcting lens to a standard initial position after the vibration correction operation.

There exists a need for an optical vibration correction system capable of accurately correcting the effects of small vibrations and having enough resolving power to determine the exact location of the correcting lens.

SUMMARY OF THE INVENTION

Accordingly, it is an object of the present invention to provide a vibration correction system for a camera which is able to correct image deflection precisely.

It is another object of the invention to provide a vibration correction system for a camera with high resolving power for the detection of the amount of movement of the correcting lens.

It is a further object of the invention to provide a vibration correction system for a camera capable of resetting the correcting lens to an exact starting position after the vibration correction operation.

Additional objects and advantages of the invention will be set forth in part in the description which follows, and, in part, will be obvious from the description, or may be learned by practice of the invention.

The foregoing objects of the present invention are achieved by providing a camera with a correcting lens driven by a reduction gear train attached to an actuator, preferably a motor. Image deflection, originating from vibration and the like of the camera, is prevented by means of the shift of the correcting lens. A movement detector, to detect the amount of movement of the correcting lens, is arranged near the drive shaft of the motor or, alternatively, near the first half of the reduction gear train. Preferably, the movement detector is a photointerruptor. After the correcting lens has been driven, it is reset to a predetermined standard position, based on the output of the movement detector.

By placing the movement detector on or near the drive shaft, because the amount of rotation of the drive shaft of the motor, or the amount of rotation of a gear of the first half of the reduction gear train, is detected as a physical quantity related to the amount of shift of the correcting lens, high resolving power is obtained. Accordingly, the correcting lens can be shifted with fine precise movements, and accurate correction of image deflection becomes possible.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
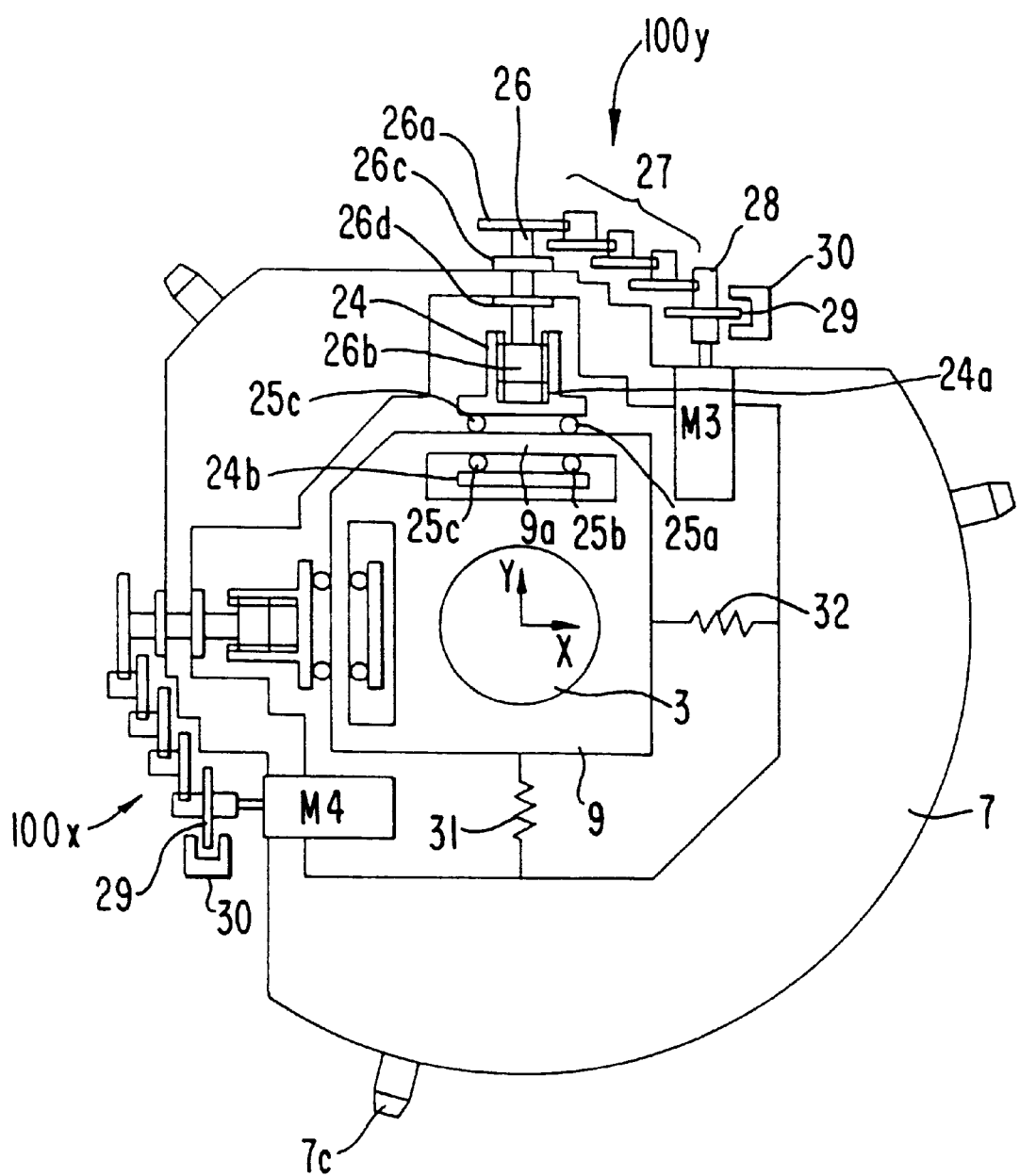
FIG. 1 is a crosswise sectional view of a vibration correction system in accordance with a preferred embodiment of the present invention.

Reference will now be made in detail to the present preferred embodiments of the present invention, examples of which are illustrated in the accompanying drawings, wherein like reference numerals refer to like elements throughout.

Figure 2:
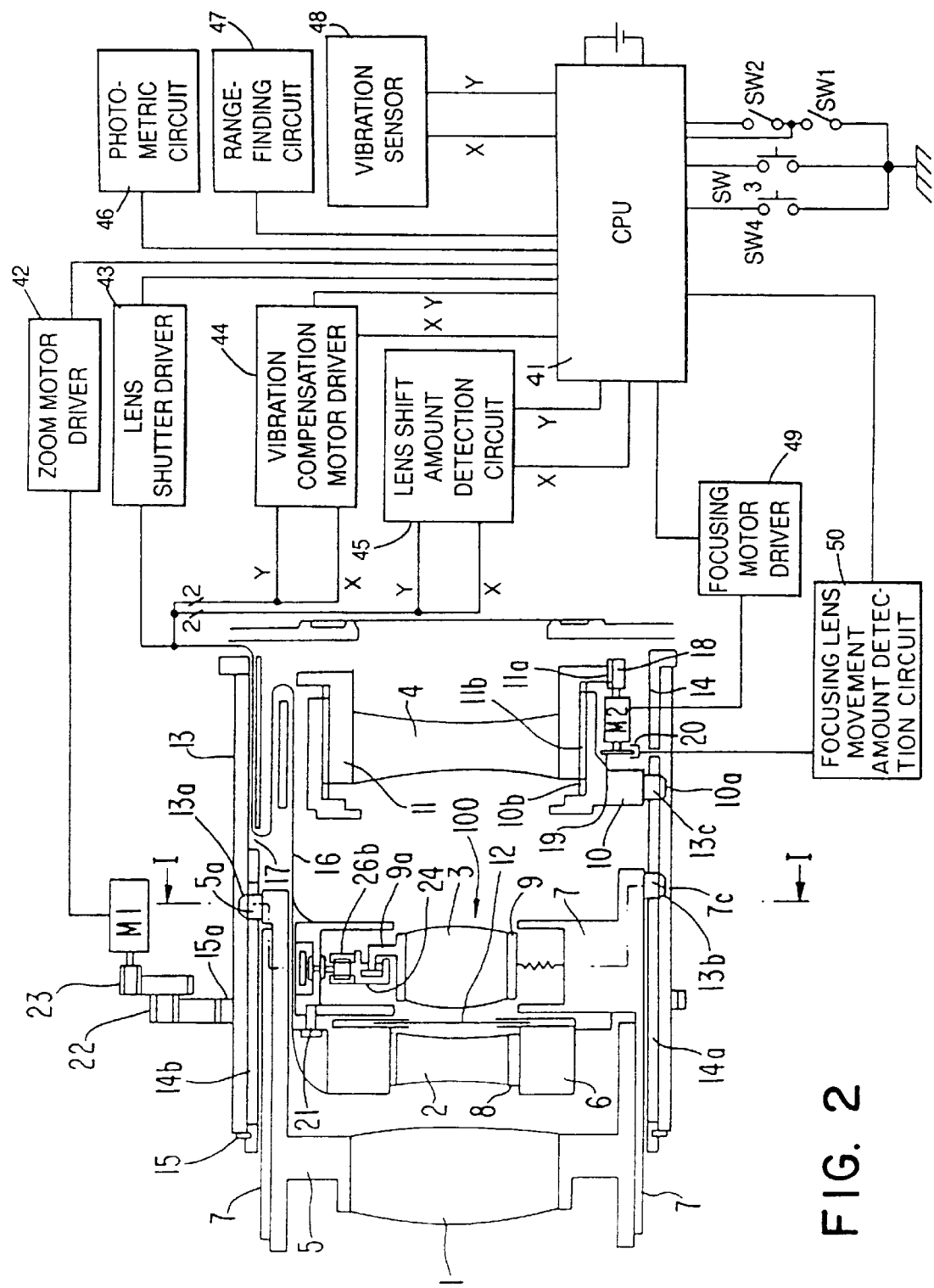
FIG. 2 is a lengthwise sectional view of a vibration correction system in accordance with a preferred embodiment of the present invention.

With reference to FIG. 2, a vibration correction system 100, according to a preferred embodiment of the present invention, is shown as part of a four lens group system having zooming lens group 1, optical lens group 2, correcting lens group 3, and focusing lens group 4.

The optical lens group 2 is supported in a drive unit 6 via a lens holder 8. A cam follower 7c, located in a baseplate 7, passes through a straight groove 14a and cooperates with a cam groove 13b.

A lens holder 5, inserted through the end of the baseplate 7, supports a zooming lens group 1. A cam follower 5a, disposed on the external peripheral surface of the lens holder 5, passes through a straight groove 14b and cooperates with a cam groove 13a.

The support mechanism for the focusing lens group 4, comprises a lens baseplate 10 inserted into a helicoid 10b, which is formed on the rear internal peripheral surface of a fixed lens barrel 14. A cam follower 10a, located on the external peripheral surface of baseplate 10, passes through the straight groove 14a and cooperates with a cam groove 13c. A lens holder 11, which supports the focusing lens group 4, has a helicoid 11b, formed on its external peripheral surface, in screw engagement with a helicoid 10b of the lens baseplate 10. A gear 18, integral with an output shaft of a focusing lens motor M2, is engaged with a gear portion 11a in the lens holder 11. The lens holder 11 is rotated by means of the rotation of the motor M2. A photointerruptor 20 is provided to detect the amount of rotation of the focusing motor M2, allowing the position of the focusing lens 4 to be determined.

A lens shutter mechanism is integrally mounted in the vibration correction system. The lens shutter mechanism comprises shutter vanes 12, which also act as a stop, and a drive unit 6. The drive unit 6 is attached to the baseplate 7, by such means as a screw 21.

FIG. 1 is a cross-sectional view, taken along line I—I in FIG. 2, of the vibration correction system of the preferred embodiment of the present invention. A lens of a camera is equipped with a correcting lens 3, which is driven in order to correct image blurring resulting from shaking or vibration of the camera. Motors M3 and M4 drive the correcting lens through corresponding reduction gear trains 27, which operate to reduce the rotational speed of the motors M3 and M4. A drive shaft 26 operates to translate the rotation of the motors and reduction gear trains into linear motion to shift the correction lens 3 in a predetermined direction orthogonal to the optical axis.

The amount of rotation of output shafts of the motors M3 and M4 is detected by detection units, for example, corresponding photointerrupters 30 and disks 29, as a physical quantity related to the amount of shift of the correcting lens 3. Alternatively, the amount of rotation of the gears in the first half of the corresponding reduction gear trains 27 may be detected. Accordingly, a high resolving power is obtained, as compared to the prior art in which the amount of rotation is detected from a gear on the last stage of the reduction gear train.

Referring again to FIG. 2, fixed lens barrel 14 is fixed to a camera body, not shown. Straight grooves 14a and 14b are formed in the peripheral surface of the lens barrel 14. A cam sleeve 13 is rotatably fitted around the outer periphery of the fixed lens barrel 14 and is prevented from slipping off by a ring 15. The rotation of a zooming lens motor M1 is transmitted via gears 22 and 23 to a gear portion 15a, formed on the outer peripheral portion of the cam sleeve 13, thereby rotating the cam sleeve 13. Cam grooves 13a, 13b and 13c are provided in the outer peripheral surface of the cam sleeve 13.

Lens baseplate 7, inserted through the internal peripheral surface of the fixed lens barrel 14, supports the vibration correction system 100. The vibration correction system 100, as shown in FIG. 2, includes a vibration correcting lens group (hereinafter "correcting lens") 3, which is supported in a lens holder 9, and a drive mechanism which drives the correcting lens 3.

With reference to FIG. 1, a drive mechanism to drive correcting lens 3 comprises an X-direction drive mechanism 100x to drive the correcting lens 3 in the X direction and a Y-direction drive mechanism 100y to drive lens 3 in the Y direction. As referred to herein, the X and Y directions are both orthogonal to the optical axis of the lens group system.

The Y-direction drive mechanism 100y has a Y-direction motor M3, and a gear 28 which rotates integrally with the output shaft of the motor M3. Reduction gear train 27 depends from the gear 28 to produce a reduced rotational speed. An externally threaded Y-direction shift drive shaft 26 is coupled to the gear train 27, which, in conjunction with an internally threaded Y-direction drive arm 24, converts the rotation of the drive shaft 26 into linear motion.

The Y-direction shift drive shaft 26 is rotatably supported on the baseplate 7 by means of a pair of flanges 26c and 26d, and its upper portion is connected to a gear 26a which engages with the last gear of the reduction gear train 27. The lower portion 26b of the shift drive shaft 26 has a male screw thread formed thereon. The Y-direction drive arm 24 is supported, able to rise and fall but unable to rotate, in a space formed in the baseplate 7. The Y-direction drive arm 24 is formed with a female screw threaded portion 24a in its upper portion. The female screw threaded portion 24a is in screw engagement with the male threaded portion 26b of the drive shaft 26.

A securing portion 24b is formed on the bottom end of the drive arm 24 for insertion into a slot in correcting lens holder 9. The correcting lens holder 9 is allowed to move freely in the X direction, at least with respects to the Y-direction drive mechanism, via slider balls 25a–25d. Spring 31 biases the lens holder 9 towards the Y-direction drive mechanism 100y. According to the rise and fall of the drive arm 24, the lens holder 9 and the correcting lens 3, is shifted in the Y direction. The amount of its shift depends on the amount of rotation of the motor M3.

The X-direction drive mechanism 100x is constructed in a similar manner to the Y-direction drive mechanism 100y, such that the correcting lens 3 is shifted in the X direction by the rotation of a X-direction motor M4, while spring 32 biases the lens holder 9 against the X-direction drive mechanism 100x.

In the vibration correction system according to the preferred embodiment of the present invention, the correcting lens 3, shifted by means of the Y-direction mechanism 100y is free in relation to the X direction, and conversely, the correcting lens 3 shifted by means of the X-direction mechanism 100x is free in relation to the Y direction. Accordingly, the correcting lens 3 can be shifted in any direction which is orthogonal to the optical axis by means of the two drive mechanisms 100x and 100y.

A disk 29, having plural perforated holes arranged on a coaxial circle, is rotatably mounted on the gear 28 which rotates about the output shaft of the Y-direction motor M3. A standard photointerruptor 30, outputs a pulse whenever it detects a hole of the disk 29. Accordingly, by counting the number of the pulses, the amount of rotation of the motor M3 (which controls the amount of Y-direction shift of the correcting lens 3) can be determined. Moreover, a similar disk 29 and photointerruptor 30 are also disposed in the vicinity of the motor M4, and by this arrangement, the amount of rotation of the motor M4 (which controls the amount of X-direction shift of the correcting lens 3) is determined.

Referring again to FIG. 2, therein is shown a block diagram of the control system for the vibration correction system according to the preferred embodiment of the present invention. The zooming lens motor M1 and the focusing lens motor M2 are connected to a zooming lens motor driver 42 and a focusing lens motor driver 49, respectively, which are in turn connected to a CPU 41. Moreover, the Y-direction motor M3 and the X-direction motor M4 (FIG. 1) of the vibration correction system, are hereinafter connected, via a flexible printed circuit board (hereinafter "FPC") 16, to a vibration compensation motor driver 44. The drive unit 6 of the lens shutter mechanism is connected to a lens shutter drive 43, via the FPC 16. Motor driver 43 and 44 are connected to the CPU 41. Furthermore, the outputs of the X-direction and Y-direction photointerruptors 30 are input to the CPU 41 via the FPC 16 and a lens shift amount detection circuit 45. The output of the photointerruptor 20 is input to the CPU 41 via the focusing lens movement amount detection circuit 50. A photometric circuit 46, to detect the luminosity of the subject, a range finding circuit 47, to detect the distance to the subject, and angular velocity sensors to detect the amount of vibration in the X direction and the Y direction, are also connected to the CPU 41.

In the example shown, four switches, connected to the CPU 41, are used to control the operation of the camera. A half depression switch SW1 is set ON upon half depression of a shutter release button (not shown). A full depression switch SW2 is set ON upon full depression of the shutter release button. Finally, a zoom up switch SW3 and a zoom down switch SW4 are provided for controlling zooming of the photographic lens.

When the zoom up switch SW3 or the zoom down switch SW4 is ON, the CPU 41 outputs drive signals to the zoom motor M1 via the zoom motor driver 42, rotating the motor M1 in a predetermined direction. This causes the cam sleeve 13 to be rotated via the gears 23, 22 and 15a, moving the cam grooves 13a, 13b and 13c. Accompanying the movement of the cam grooves 13a–13c, each cam follower 5a, 7c, 10a is driven along the straight groove 14a or 14b, and the lens holder 5 supporting the lens group 1, the baseplate 7 supporting the lens groups 2 and 3, and the baseplate 10 supporting the lens group 4 are driven along the optical axis direction, performing zooming.

When the half depression switch SW1 is set ON, the CPU drives the photometric circuit 46 and the range finding circuit 47 to perform photometry and range finding. Further, the focusing motor M2 is driven, based on the range finding result, via the focusing motor driver 49. This causes the lens holder 11 to rotate, via the gears 18 and 11a, and accompanying this, by the operation of the above-mentioned helicoids 10b and 11b, the lens holder 11 is driven along the optical axis. In other words, the focusing lens 4 rotates, causing it to move along the optical axis, and focusing is performed. The photointerruptor 20 detects information relating to the amount of movement of the focusing lens 4, and communicates this to the CPU 41, via the focusing lens movement amount detection circuit 50.

When the full depression switch SW2 is activated, the CPU 41 outputs shutter drive signals, based on the above-mentioned photometric result, to the shutter drive unit 6 via the lens shutter driver 43. During this time, the appropriate drive amount and drive direction of the correcting lens 3 for vibration correction are calculated from the amounts of X-direction and Y-direction vibration detected by the vibration sensor 48. Vibration correction signals, based on these calculated results, are output to the vibration compensation motor driver 44. For example, the rotation of the Y-direction motor M3 is transmitted via gear 28, reduction gear train 27 and shaft 26, at a reduced speed, to the Y-direction shift drive shaft 26, thereby rotating the male screw portion 26b of the drive shaft 26. The Y-direction drive arm 24 moves up or down due to the screw operation accompanying the rotation of the male screw portion 26b. The lens holder 9, which is held in the inserted portion 24b of the drive arm 24, and the correcting lens 3, are moved in the Y direction, guided by the balls 25a–25d in the vicinity of the X-direction drive mechanism 100x. Moreover, due to the rotation of the X-direction motor M4, the correcting lens 3 is similarly shifted in the X direction.

Concurrently with, or shortly following, the activation of the vibration correction system, the shutter drive unit 6 drives the lens shutter 12, in response to the above-mentioned shutter drive signals, to release the shutter. The vibration compensation motor driver 44 continues the rotation of the motors M4 and M3 in the X and Y directions according to the vibration signals. In this manner, because the correcting lens 3 is shifted in a direction orthogonal to the optical axis, image deflection originating from vibration can be prevented during exposure.

When the Y-direction and X-direction motors M4 and M3 are rotated, the X-direction and Y-direction photointerruptors output a number of pulse signals corresponding to the amount of rotation of their respective motors. These pulse signals are input to the CPU 41 via the lens shift amount detection circuit 45. The CPU 41 counts the number of input pulses and calculates the shift amount of the correcting lens 3 relating to the X and Y directions based on these count results. From this count, the position of the correcting lens 3 can be determined.

Even after shutter release, the vibration sensor 48 continually detects the amount of vibration and inputs it to the CPU 41. Similarly, the CPU 41, continuously calculates the appropriate drive direction and drive amount of the correcting lens, according to the lens shift amount (lens position), based on the amount of vibration and the pulse signals of the photointerruptor 30.

In the preferred embodiment, the disks 29 used to detect the amount of shift of the correcting lens 3 are integral with the output shafts of the motors M3 and M4. As such, they directly indicate the amount of rotation of these output shafts as measured by the photointerruptors. Therefore, the resolving power can be greatly increased in comparison with detecting the amount of rotation of the gear 26a (in FIG. 1) which indicates the amount of rotation reduced by the reduction gear train 27. By measuring the rotation directly from the output shaft, it is possible to drive the shift of the correcting lens with fine distinctions. Accordingly, accurate correction of even minute image deflection is possible.

When the shutter release period is concluded, the CPU 41 recognizes the present position of the correcting lens 3, from the detected amount of lens shift, based on the output of the above-mentioned photointerruptors, and thereafter causes the correcting lens 3 to reset to a predetermined standard position (for example, a position in which the optical axis of the correcting lens 3 coincides with the optical axis of the photographic lens).

Although a first embodiment of the present invention has been described with respect to a specific configuration, it will be recognized that the first embodiment is not limited to the specific configurations. For example, although the first embodiment has been described with respect to the use of photointerruptors as the movement detector, photoreflectors may be used to provide the required output. Moreover, while the amount of rotation of the output shafts of the motors M3 and M4 was directly detected, the rotation of gears in the first half of the reduction gear train may also be detected. As used herein, the term "first half of the reduction gear train" refers to those gears closest to the motor. However, the resolving power is reduced compared to with directly measuring the amount of rotation from the motor drive shafts. Moreover, the mechanism which converts rotary motion into rectilinear motion and brings about the shift of the correcting lens is not limited to the above embodiment. For example, a cam mechanism may be used, or a rack and pinion mechanism could be utilized.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A lens barrel, comprising:

an optical system having an optical axis;

an optical base to support the optical system and to move the optical system along the optical axis direction, the optical base having cam followers positioned on an external surface thereof, the cam followers extending in a direction generally perpendicular to the optical axis; and shafts to support a gear train, the shafts positioned on the optical base in a direction generally perpendicular to the optical axis.

2. The lens barrel, as set forth in claim 1, wherein the optical base, the shafts and the cam followers are formed as a molded unit in which the shafts and the cam followers have different extraction angles.

3. The lens barrel, as set forth in claim 2, wherein the optical system includes a vibration compensation lens operatively connected to the shafts, the vibration compensation lens being adjusted in a direction generally perpendicular to the optical axis.

4. The lens barrel, as set forth in claim 1, wherein the optical system includes a vibration compensation lens operatively connected to the shafts, the vibration compensation lens being adjusted in a direction generally perpendicular to the optical axis.

5. The lens barrel, as set forth in claim 4, further comprising a drive mechanism positioned on the optical base and operatively connected to the shafts.

6. The lens barrel, as set forth in claim 1, further comprising a drive mechanism positioned on the optical base and operatively connected to the shafts.

7. The lens barrel, as set forth in claim 1, wherein the shafts are positioned on an interior surface of the optical base.

8. A lens barrel, comprising:

a correction optical system to correct image blur, the correction optical system having an optical axis:

a correction optical system drive system to drive the correction optical system in a direction to correct image blur;

a base to support the correction optical system and the correction optical system drive system, and to move the correction optical system and the correction optical system drive system in an optical axis direction, the base having cam followers formed on a periphery thereof, the cam followers extending in a direction generally perpendicular to the optical axis; and a rotatable cam sleeve surrounding the base, the cam sleeve having cam grooves into which the cam followers fit, wherein rotation of the rotatable cam sleeve moves the base in the optical axis direction.

* * * * *